(No Model.)
C. A. PIERCE.
AUTOMATIC LUBRICATOR.
No. 450,421. Patented Apr. 14, 1891.
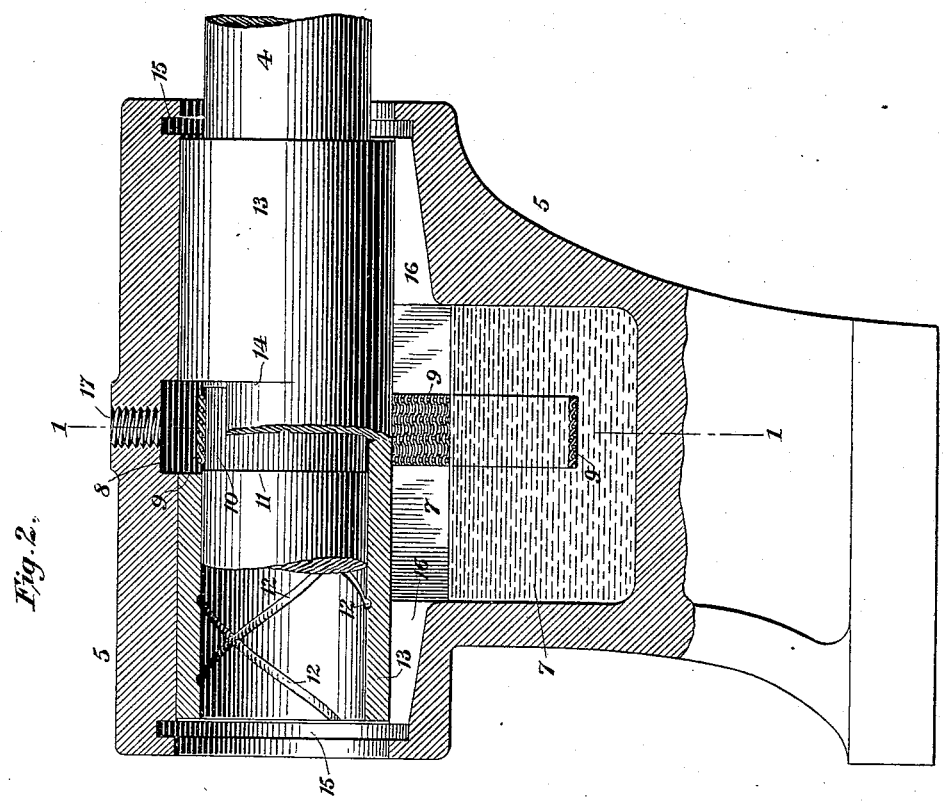
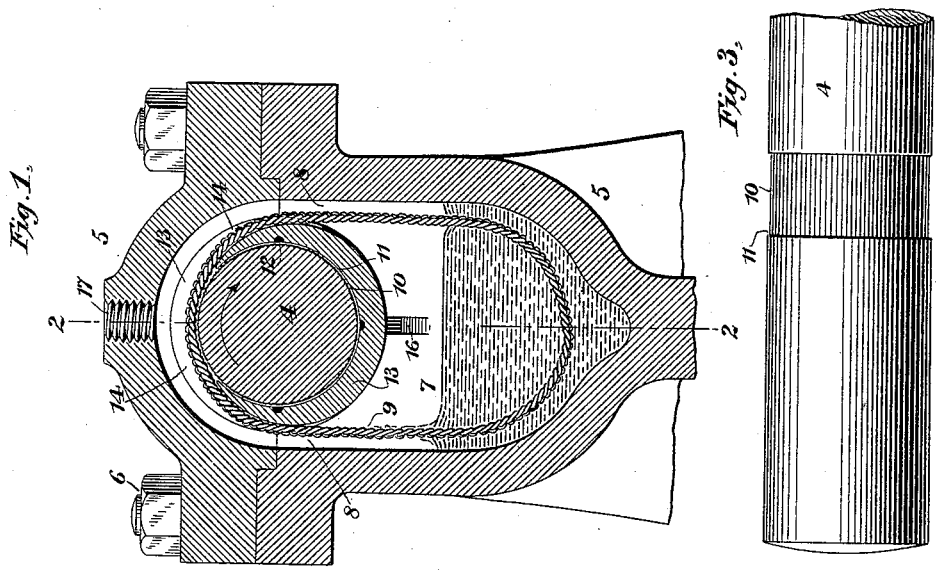
Witnesses
Geo. W. Breck.
Saml. F. Macpeak.
Inventor
Charles A. Pierce,
By his Attorneys
Fowler & Fowler

UNITED STATES PATENT OFFICE.

CHARLES A. PIERCE, OF LYNN, MASSACHUSETTS, ASSIGNOR TO THE EUREKA ELECTRIC COMPANY, OF NEW YORK, N. Y.

AUTOMATIC LUBRICATOR.

SPECIFICATION forming part of Letters Patent No. 450,421, dated April 14, 1891.

Application filed January 13, 1891. Serial No. 377,631. (No model.)

*To all whom it may concern:*

Be it known that I, CHARLES A. PIERCE, a citizen of the United States, residing at Lynn, Essex county, State of Massachusetts, have invented certain new and useful Improvements in Automatic Lubricators, of which the following is such a full, clear, and exact description as will enable any one skilled in the art to which it appertains to make and use the same, reference being had to the accompanying drawings, forming part of this specification.

My invention relates to the class of automatic lubricators in which an endless chain or belt is passed from an oil-reservoir over an exposed portion of the shaft of a bearing in such a manner as to automatically supply the oil to the bearing; and the invention consists in the various novel and peculiar combinations and arrangements of the several parts of the device, all as hereinafter fully described, and then pointed out in the claims.

In the accompanying drawings, illustrating my invention, Figure 1 is a sectional view of a bearing provided with my improvements, the plane of the section being indicated by line 1 1 in Fig. 2. Fig. 2 is a sectional view of the same, the plane of the section being indicated by line 2 2 in Fig. 1. In this view a portion of the shaft and a portion of the bushing are broken away. Fig. 3 is a detached side view of a portion of the shaft of the bearing, showing the roughened transverse groove formed therein.

Referring to the said drawings, in which like numbers of reference indicate like parts throughout, 4 designates a shaft turning in a bearing 5, which is horizontally divided and held together by suitable bolts 6. An oil-reservoir 7 is suitably formed and arranged in a convenient place beneath the bearing, and an opening or passage-way 8 leads over the shaft transversely thereof from one side of the same to the other and communicates at each side with the said reservoir. This opening or passage-way 8 is cut or formed in the bearing in such a way as to expose, preferably upon the top or crown of the shaft, a sufficient portion thereof for the oiling chain or belt 9 to come in contact with the shaft and receive its motion therefrom. This chain or belt 9 is an endless one, made preferably of metal, such as copper or brass, and as the shaft rotates in the direction of the arrow, Fig. 1, it serves to raise the oil from the reservoir 7 and deposit it upon the exposed portion of the shaft with which it makes contact.

In order to drive the oiling-chain 9 with a positive motion, I form the shaft 4 with a roughened zone or area 10, extending transversely around the same, and preferably sink the same into the shaft, so as to form a transverse annular groove 11 therein. This roughening may be effected by forming longitudinal corrugations or teeth on the shaft, as shown in the drawings, though any preferred way of doing this may be adopted. This roughening of the shaft where it makes contact with the oiling-chain will obviously increase the friction between the chain and shaft, so as to prevent the former from slipping on the same and to drive it with a positive and regular action, thereby keeping the supply of the lubricant to the bearing uniform.

The groove 11 receives the oil as it is raised by the chain, and the oil being thus deposited therein the groove acts as a storage-chamber for supplying the oil to the bearing. The oil is distributed longitudinally of the bearing by means of spiral ducts 12, formed in the working-face of the journal-box of the bearing, which box is preferably provided with a fixed bushing 13. These spiral distributing-ducts 12 run in reverse directions over the working-face of the journal-box, so as to cross each other, as clearly shown in Fig. 2, and are obviously supplied by oil from the groove 11, the pressure of the oil in which will keep the ducts communicating therewith constantly filled with oil. When the bearing is provided with the bushing 13, the same of course has to be cut away, as at 14, in order to expose the crown of the shaft to the oiling-chain 9, as will be readily understood from the drawings. The bearing at each end is provided with an annular chamber 15, which communicates with a channel 16, running beneath the shaft and connecting the chamber 15 with the oil-reservoir 7, whereby the oil which has been raised by the chain and distributed lengthwise the bearing may be returned to the reservoir.

By removing the upper portion of the horizontally-divided bearing 5 access may readily be had to the oiling-chain and the exposed portion of the shaft, as well as to the passage-way 8, through which the chain travels.

The lubricant or oil may be introduced into the reservoir in any suitable manner. For instance, it may be poured through the opening 17 at the top of the bearing, from where it would easily find its way through the passage-way 8 into the reservoir.

Having thus described my improvements in automatic lubricators, what I claim as my invention, and desire to secure by Letters Patent, is—

1. The combination, with a bearing, of a shaft formed with a roughened zone or area extending transversely around the shaft, an oil-reservoir, an opening or passage-way formed in the bearing and leading from the oil-reservoir to an exposed portion of the roughened part of the shaft, and an oiling chain or belt passing through said opening and making contact with the said exposed portion of the shaft for automatically lubricating the bearing.

2. The combination, with a bearing, of a shaft formed with a roughened transverse annular groove, an oil-reservoir, openings leading therefrom to the groove in the said shaft, and an oiling chain or belt extending from the reservoir through the said openings and lying in a part of the groove in the shaft for automatically lubricating the bearing.

3. The combination, with a bearing, of a fixed bushing, a shaft formed with a roughened zone or area extending transversely around the shaft, an opening or passage-way leading over the shaft from one side thereof to the other and communicating at each side with the oil-reservoir, the said bushing cut away at the upper part thereof so as to expose the roughened portion of the said shaft to the said opening or passage-way, and an oiling chain or belt extending from the oil-reservoir through the opening and making contact with the exposed portion of the said shaft for automatically lubricating the bearing.

4. The combination, with a bearing, of a shaft 4, formed with a roughened zone or area 10, extending transversely therearound, an oil-reservoir 7, and a passage-way 8, leading over the shaft from one side thereof to the other and communicating with said oil-reservoir and exposing a portion of the shaft therein, and an endless oiling-chain 9, leading from the oil-reservoir through the passage-way 8 and making contact with the exposed portion of the shaft for automatically lubricating the bearing.

In testimony whereof I have hereunto set my hand this 10th day of January, 1891, in the presence of the two subscribing witnesses.

CHAS. A. PIERCE.

Witnesses:
WILLIS FOWLER,
CHAS. D. FOWLER.